United States Patent [19]

Lyman et al.

[11] 3,999,170

[45] Dec. 21, 1976

[54] MULTIPLE ACCESS INTERCONNECT SYSTEM

[75] Inventors: Richard Ricker Lyman, Palo Alto, Calif.; Ole Eskedal, Ballerup, Denmark

[73] Assignee: Hewlett-Packard Company, Palo Alto, Calif.

[22] Filed: Jan. 8, 1975

[21] Appl. No.: 539,359

[52] U.S. Cl. .................... 340/173 R; 340/173 DR
[51] Int. Cl.² ........................................ G11C 13/00
[58] Field of Search ................ 340/173 R, 173 DR

[56] References Cited

UNITED STATES PATENTS

3,748,651   7/1973   Mesnik ..................... 340/173 DR

Primary Examiner—Terrell W. Fears
Attorney, Agent, or Firm—Theodore Scott Park

[57] ABSTRACT

A synchronous multiple access interconnect system includes a bus and a plurality of master units each having a six state sequencer coupled to a plurality of serially connected AND gates, the bus and logic to provide signal settling time, generate handshake signals, receive handshake signals, transfer data, resolve contention for the bus between several requesting units and pass control of the bus in an orderly manner from one unit to another. Three signal lines of the bus pass control of the bus from one unit to another.

11 Claims, 11 Drawing Figures

FIGURE 1

BUS CYCLE FLIP FLOPS

| SEQUENCE | STATE 32 | STATE 34 | STATE 36 | MEANING | BUSY | REQUEST | PRIORITY OUT | INPUT TO STATE |
|---|---|---|---|---|---|---|---|---|
| I | 0 | 0 | 0 | IDLE | 0 | 0 | PRIORITY IN | STATE 001 |
| II | 1 | 0 | 0 | REQUEST BUS | 0 | 0 | 0 | |
| III | 1 | 1 | 0 | GET BUS GATE OUT ADDRESS | 1 | 0 | 0 | STATE 100 $\overline{\text{BUSY}}\cdot\text{PRIORITY IN}$ |
| IV | 1 | 1 | 1 | REQUEST | 1 | 1 | 0 | STATE 110 |
| V | 0 | 1 | 1 | DECODE INPUT BYTE | 1 | 1 | PRIORITY IN | $\overline{\text{WAIT}}\cdot$ STATE 111 |
| VI | 0 | 0 | 1 | RELEASE BUS | 0 | 0 | PRIORITY IN | STATE 011 |

| TYPE OF BUS TRANSFER | | |
|---|---|---|
| READ MEMORY | $\overline{I/O}$ high | $\overline{WRITE}$ high |
| WRITE MEMORY | $\overline{I/O}$ high | $\overline{WRITE}$ low |
| INPUT | $\overline{I/O}$ low | $\overline{WRITE}$ high |
| OUTPUT | $\overline{I/O}$ low | $\overline{WRITE}$ low |

MULTIPLE ACCESS INTERCONNECT SYSTEM

BACKGROUND AND SUMMARY OF THE INVENTION

A bus is an interconnection method and hardware by means of which a number of electronic modules may communicate. External controlling logic in combination with bus logic in each module typically handles the problem of a plurality of modules using the same bus. External controlling logic is often required since there can be several masters which desire to transfer data on the bus, but only one may use a data path at a time. The external controlling logic may be a part of a special module such as a central processing unit of a computer but this has a tremendous drawback in that there can be only one of this type of module in a system. Data lines for connecting modules are typically required as well as additional control signal lines to facilitate sharing of the bus resource between masters. It is an object of the invention to keep the number of control lines at a minimum for economy.

The frequency and direction of bus transfers tend to become random since there may be many master modules operating independently thereby complicating servicing of equipment and development of new modules. It is a further object of the invention to make the bus synchronous in that signals change only at well defined times. This is in contrast to asynchronous operation wherein bus settling times are determined by, for example, delay gates in the module logic. Such delays often prove in practice to be an unreliable and variable delay source. A further disadvantage with asynchronous logic is that it cannot be single stepped through its operations as can synchronous logic. Synchronous logic has an additional advantage over asynchronous logic in that it is less sensitive to noise impulses.

It is a further object of the invention to ensure that signals switch in unison and have until a next clock pulse or a selected time interval to settle down so that the bus is essentially in a static state by the time signals are sampled and that circuitry operate on levels rather than edges.

Three wires, a plurality of master units each having a sequencer and a plurality of logic gates perform necessary switching at well defined times to give any master unit control of the bus. Three lines pass control of the bus from one unit to another. The system requires no external controlling logic thereby simplifying operations and eliminating a need for a special purpose bus controller, system controller, or central processing unit.

DESCRIPTION OF THE PREFERRED EMBODIMENT

Figure 1:
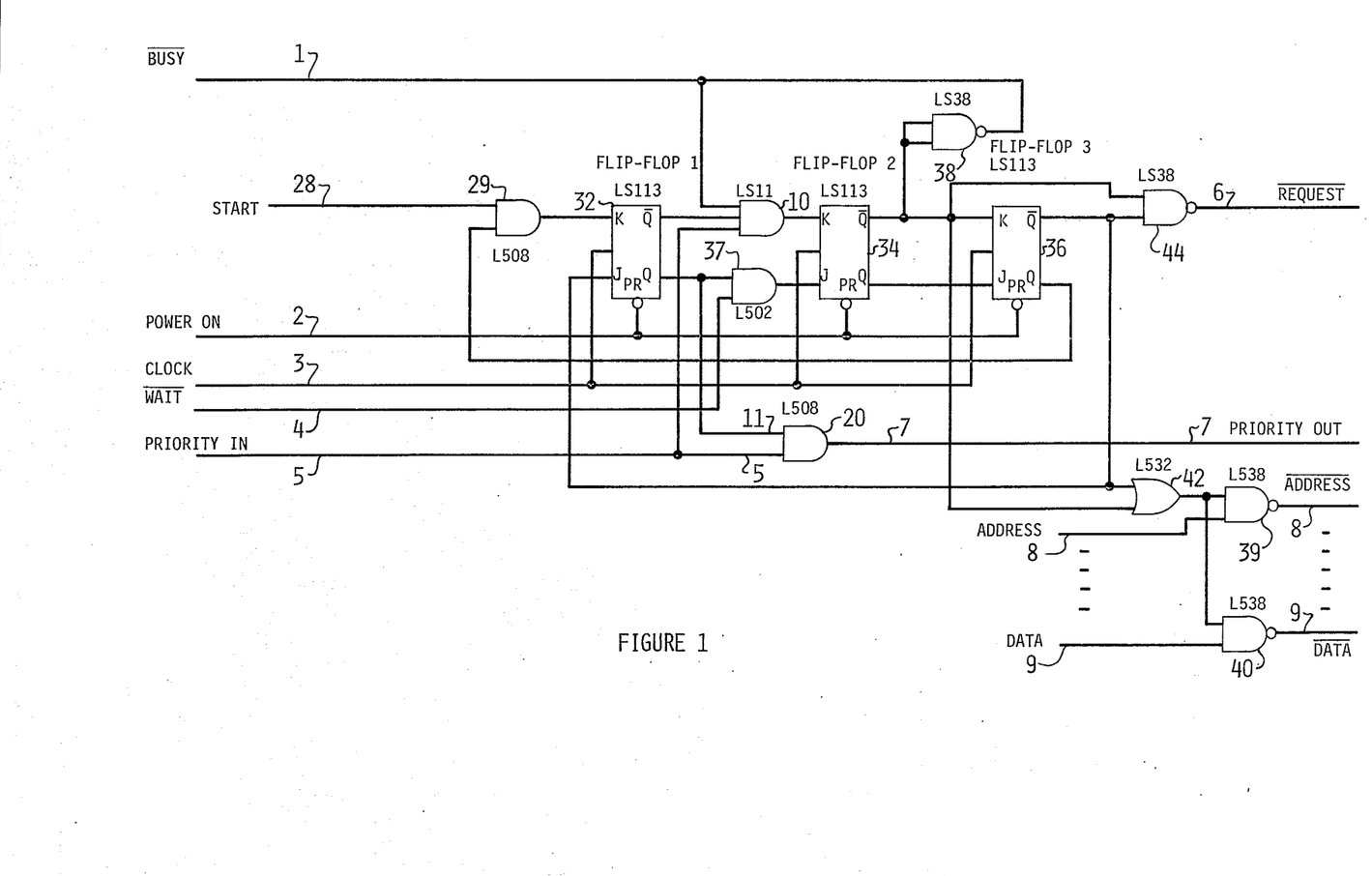
FIG. 1 is a schematic diagram of a preferred embodiment of a master unit for a system made in accordance with the invention.
Figure 2:
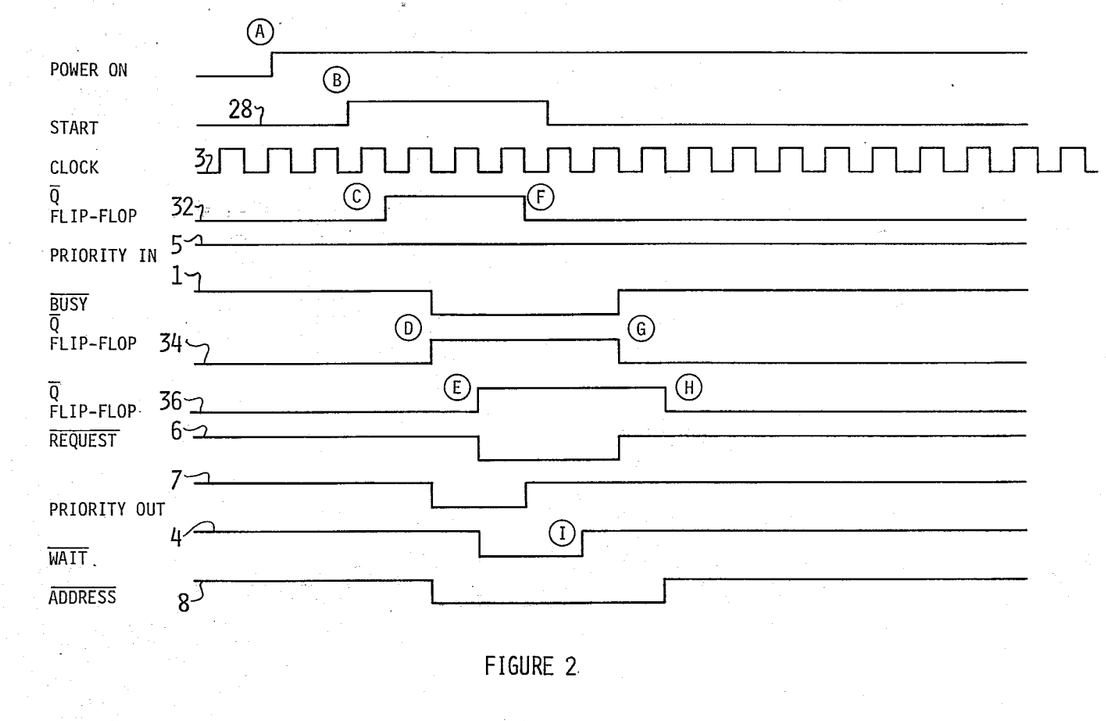
FIG. 2 is a timing diagram illustrating operation of the master unit of FIG. 1.
Figure 3:
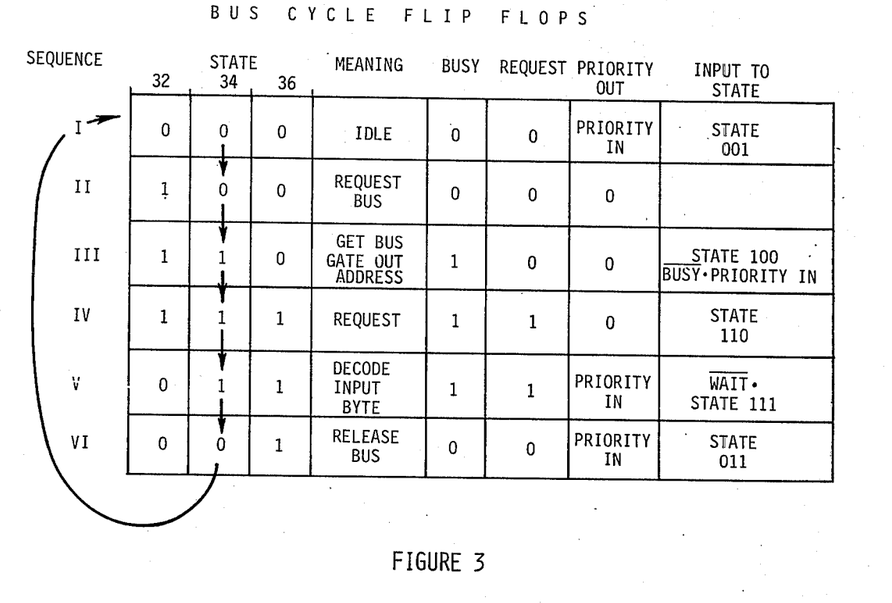
FIG. 3 is a table illustrating the logic sequence of the master unit of FIG. 1.

Referring to FIGS. 1 and 2, circuitry and timing sequences of a preferred embodiment of a master unit within a synchronous multiple access interconnect system capable of initiating bus cycles is shown. A six state counter grabs control of the bus and generates request timing. The circuit has three flip-flops, 32, 34 and 36. Power 2 is initially applied as shown by point A in FIG. 2. Flip-flop 32 is set when a start line 28 coupled to a K input of flip-flop 32 by AND gate 29 goes high as shown at point B in FIG. 2 and flip-flops 32, 34 and 36 have a combined Q output logic state of 000 as shown in FIG. 3. The start line 28 begins the entire handshake process. It is generated internally by a module and goes to a high state when the module initiates a bus cycle. When flip-flop 32 goes high this is ANDed by means of AND gate 10 with signal lines BUSY 1 and PRIORITY IN 5. If BUSY line 1 and PRIORITY IN line 5 are both high this indicates that the circuitry may take control of the bus. Referring to FIG. 1 this is done by gate 10 setting the flip-flop 34. This sets the bus signal BUSY 1 low as shown at point D in FIG. 2 through an open collector gate 38 which may be a Texas Instruments Type LS38, or the like. At this point, all other master modules are inhibited from gaining control of the bus by the low BUSY signal 1. They can set their flip-flops 32 but cannot continue further in the process.

Coincident with BUSY being set low, an address 8 and data 9 are placed on the bus by open collector gates 39 and 40. Open collector gates 39 and 40 are, for example, Texas Instruments type LS38 or the like, coupled to receive, respectively, an address 8 and data 9 are each coupled by means of an OR gate 42 to the Q outputs of flip-flops 34 and 36. The bus cycle flip-flops are all clocked off the trailing edge of bus clock signal 3. After flip-flop 34 goes high, thereby producing the combined state 110, shown in FIG. 3, flip-flop 36 is set. The Q outputs of flip-flops 34 and 36 are coupled to an open collector gate 44. Gate 44 enables request signal 6 on the bus as shown at point E in FIG. 2. A slave module, if it needs time to finish executing an operation, may hold off completion of the bus cycle with WAIT line 4. Wait line 4 is coupled to an input of an AND gate 37. AND gate 37 has another input coupled to the Q output of the flip-flop 32 and an output coupled to the J input of flip-flop 34. A terminal memory may, for example, decode its address and start a timer upon receiving request 6. The memory can set a WAIT signal 4 low to indicate that the circuitry should wait for the memory access time as is done for example in the cathode ray tube refresh apparatus disclosed in copending U.S. Pat. Application Ser. No. 508,600. When the memory's timer times out it sets WAIT line 4 high as shown at point I and the circuitry proceeds to reset flip-flop 32. At this moment data is clocked off the data bus. The circuitry then resets flip-flop 34 as shown at point G in FIG. 2 This takes REQUEST 6 off the bus. A terminal memory may, for example, discontinue outputted data when it sees this. Two hundred nanoseconds later the address 8 is taken off the terminal bus as flip-flop 36 goes low as shown at point H in FIG. 2. The bus control circuitry has now completed the six state sequence shown in FIG. 3 and is ready to start over. The preferred embodiment thereby requires only 3 lines which may be labeled BUSY 1, PRIORITY IN 5 and PRIORITY OUT 7 to pass control of the bus from one master to another.

Figure 4:
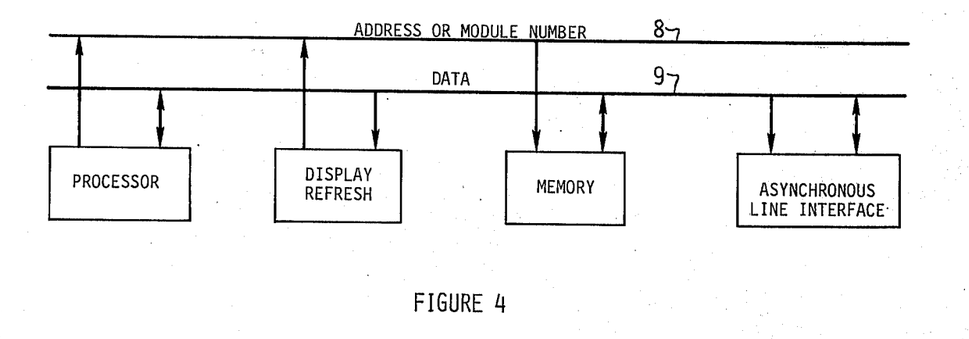
FIG. 4 is a block diagram of a system made in accordance with the invention.

Referring to FIG. 4 there is shown a block diagram representing a portion of a cathode ray tube display refresh system of a type disclosed for example in prior filed, commonly owned U.S. Patent Application Ser. No. 580,600, entitled LINKED LIST ENCODING METHOD AND CONTROL APPARATUS FOR REFRESHING A CATHODE RAY TUBE DISPLAY by Richard R. Lyman et al. Such a terminal contains a single bus which connects memories, input/output modules, and a processor and the data width is 8 bits, module numbers are 0-15, addressing space comprises 65K bytes, the system has a clock frequency of 4.915 MHz and the required maximum transfer rate is 1.635 MHz.

Figure 5:
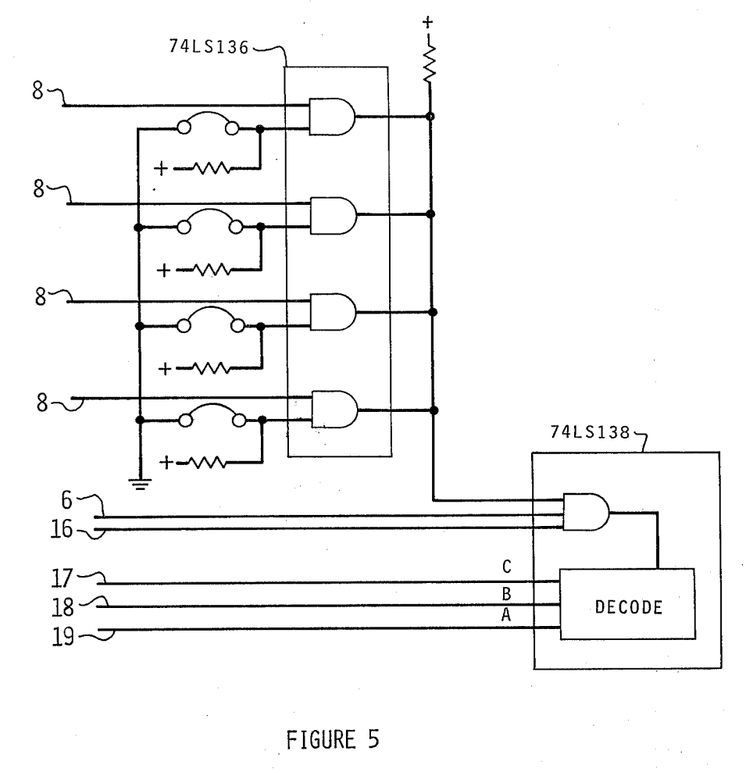
FIG. 5 is a diagram showing a general purpose bus interface for use with the system of FIG. 4.

Referring to FIG. 5 there is shown a general purpose bus interface for use with the system of FIG. 4 and the preferred embodiment. This is a slave interface in that it cannot initiate bus transfers. Instead, it always monitors the module address 8, the INPUT/OUTPUT line 16 and the REQUEST line 6. When it recognizes its module number and the INPUT/OUTPUT line 16 is low, then it is being addressed. The strobe lines 18, 19 differentiate between the several different kinds of input or output transfers. For example, the device may be capable of an input transfer of data or an input transfer of status. The master module which is communicating with this slave puts the proper strobe bits on the bus to call out one or the other of these operations. Assume the number of modules to be addressed is 16, that the output strobes required are two for modules 8-15, one for modules 0-7 and input strobes are 128 for modules 0-15. An input/output module decodes its module number, ANDs this with REQUEST line 6 and INPUT/OUTPUT line 16 to be selected. The direction of the transfer is indicated by a WRITE line 17. The circuits indicated as 74LS136 and 74LS138 in FIG. 5 are commercially available hardware items which may be obtained from Texas Instruments.

The six-state sequencer shown in FIG. 1 grabs control of the bus and generates request timing as depicted in FIG. 3. The signals and functions will now be discussed.

PRIORITY IN 5 is a signal which is important during a period when two modules request the bus at exactly the same time. The module having a higher priority disables a lower priority module from grabbing the bus by means of its PRIORITY OUT line 7.

One module's PRIORITY OUT line 7 is a next module's PRIORITY IN line 5.

A BUSY signal 1 indicates that a module is currently in control of the bus while it is low and no other module can gain control of the bus. It is released before the removal of a module address from the bus. This allows bus cycles to be butted up against each other with the slew of the address signal being removed by one module overlaying the address signal being applied by an oncoming module.

As soon as a module detects the request signal 6 it pulls the WAIT signal 4 low and holds it low until it is ready to put data on the bus or it is finished with its write cycle. This allows different speed memories to be used in the system. An input/output module or a fast memory need not use this line if they can withstand short request cycles.

The REQUEST line 6, when low, indicates that the address lines are settled and that a bus transfer is to take place.

Figure 7:
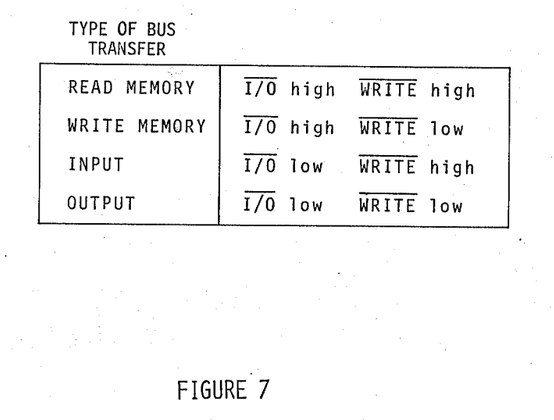
FIG. 7 is a table showing the relationship between the states of read, input, output and write and types of bus transfers.

Four different kinds of bus transfers may take place in the system of FIG. 4. These types of bus transfers are READ MEMORY, WRITE MEMORY, INPUT, and OUTPUT. The state of the lines INPUT/OUTPUT 16 and WRITE 17 specify which operation is in progress as shown in FIG. 7. These lines are somewhat like two additional address lines and must conform to the same timing rules as do address lines.

Figure 8:
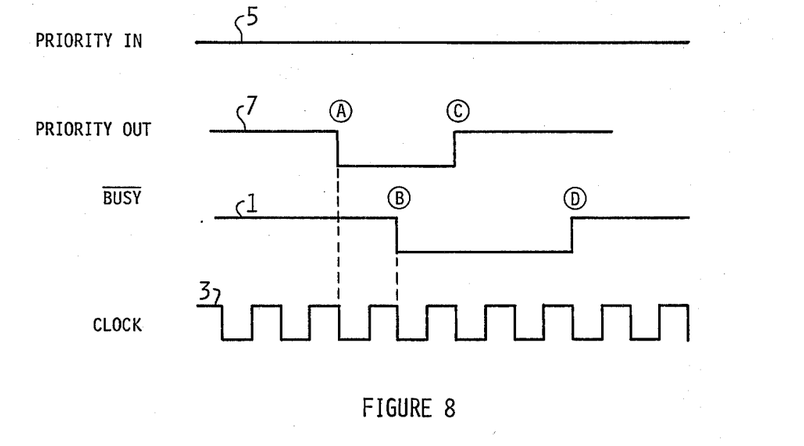
FIG. 8 is a timing diagram illustrating events which occur when a master unit takes control of the bus.

Referring to FIG. 8 there is shown relative timing of BUSY signal 1, PRIORITY IN 5, and PRIORITY OUT 7. Priority lines 5 and 7 solve the problem of simultaneity wherein two master modules want control of the bus at exactly the same time. In this event, the priority line shown in FIG. 6 selects one module over the other. A priority line or string serves this purpose by giving preference to the module which connects serially into the string nearest its beginning.

Referring to FIG. 8 there is shown a priority line which serves the purpose of giving preference to one module over another. When a master A wants control of the bus it sets PRIORITY OUT line 7 to a logic state 0 by setting line 11 of AND gate 20 to a logic state 0. In FIG. 8 this is shown as point A.

Referring to FIG. 8, the time between points A and B is the priority resolution period. PRIORITY OUT signal 7 ripples down the chain through the modules. At time B shown in FIG. 11 there will be only one module, the highest requesting module in the chain which has its PRIORITY IN as a logic 1 and its PRIORITY OUT as a logic 0. Thus a single module is singled out even though several modules may have requested the bus simultaneously. Referring again to FIG. 8, at point B the module which has been selected by the priority mechanism pulls BUSY line 1 to a logic 1 state. This is a ground true "wired or" line and therefore may be activated from any module. While BUSY line 1 is low no other module may take control of the bus. The priority line has served the purpose and therefore PRIORITY OUT line 7 may be set high as shown at point C in FIG. 11.

After gaining control of the bus, data transfer takes place as determined by a master module. The master module may cause a single data transfer or it may create a burst of transfers. After the data transfers have been completed; BUSY line 1 is released to its logic 0 state shown as point D in FIG. 11 thus leaving the bus free to repeat the control cycle.

Figure 9:
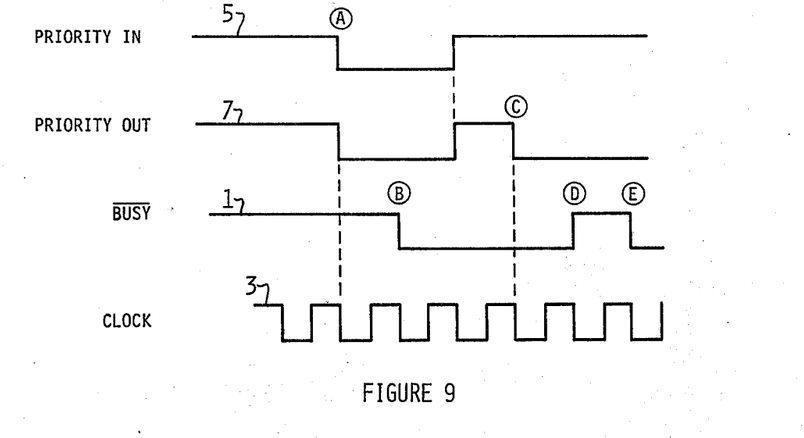
FIG. 9 is a timing diagram illustrating events which occur when a high priority module takes control of the bus.

Referring to FIG. 9 there is shown the event of a higher module requesting the bus and inhibiting lower priority modules from taking control. Lower modules are inhibited by PRIORITY IN line 5 until point B, then they are inhibited by BUSY line 1 until point D. Only after point C does the lesser priority module gain control activating BUSY line 1 at point E.

Figure 10:
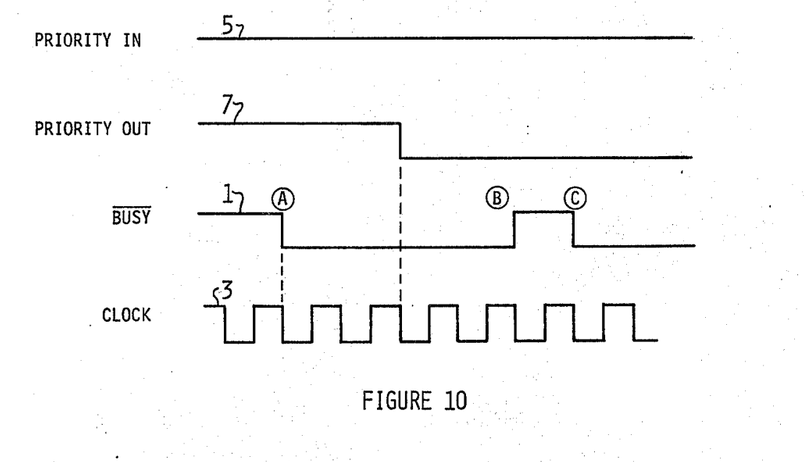
FIG. 10 is a timing diagram illustrating events which take place when a lower priority module takes control of the bus.

Referring to FIG. 10 there is shown the event of a lower module taking control of the bus. At point A a lower module gains control of the bus. This inhibits a higher requesting module until point B, after which at point C, a higher requesting module gains control. Conditions for taking control of the bus are therefore PRIORITY IN line 1 being in logic state 1, PRIORITY OUT line 7 being in logic state 0 and BUSY line 1 being at logic state 0.

Figure 11:
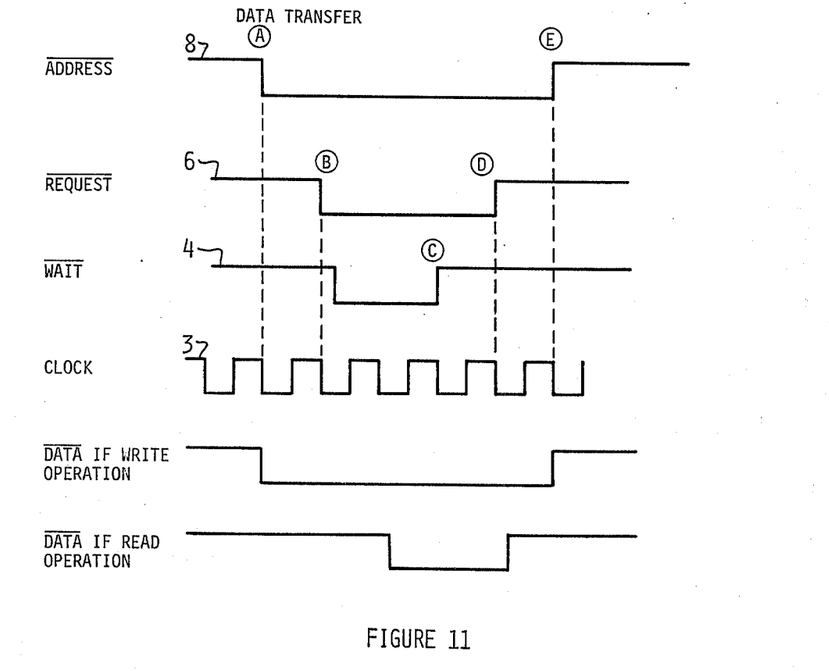
FIG. 11 is a timing diagram illustrating data transfer control.

Referring to FIG. 11, the signaling processing initiated by a master module after it has control of the bus may be referred to as data transfer control. Data transfer control selects a slave module, waits for a transfer of data to complete and gates the data onto or off of the bus. Referring to FIG. 11, data representing a memory address, an input or output device number, the type of transfer and the direction are switched at point A. The elapsed time between point A and point B is the settling time for the address 8. At point B a master module initiates the operation by setting REQUEST line 6 to a logic state 1. Each slave module decodes the address and recognizes if the request is meant for it as indicated by its module number matching the one on the bus if it is an input/output module, or its address range encompassing the address on the bus if it is a memory.

If the addressed slave cannot perform the bus transfer in one clock cycle it immediately sets WAIT line 4 to a logic 1. WAIT 4 is the handshake signaled from the slave to the master that an operation is complete. At point C a slave has either processed the data as in the case of a WRITE operation or has gated data onto the bus as in a READ operation. A slave signals completion by returning WAIT line 4 to a logic state 0. The master completes the cycle by releasing REQUEST line 6 to a logic state 0 at point D and by deactivating address lines at point E.

This system provides a means for connecting a plurality of master and slave units in a manner requiring no one specialized unit. This is useful in multiple processor systems wherein there may be several processor units all sharing a single memory. Other applications include systems without a processing unit wherein several special purpose units such as, for example, a cathode ray tube refresh apparatus of the type disclosed in copending U.S. Pat. Application Ser. No. 508,600 wherein the apparatus shares memories and input/output devices. It is also useful for systems with a number of devices such as asynchronous data communication channels transferring information between channels without going through a central controller. Synchronous operation is employed thereby increasing reliability because of system insensitivity to noise impulses. Time delay circuitry is eliminated and service is enhanced.

I claim:

1. A system for interconnecting a plurality of units having means for transmitting information with at least one unit having means for receiving information, at least one of said units including means for generating a priority signal, comprising:

a bus for coupling the units;
means in each unit having means for transmitting information for generating a busy signal onto the bus in response to said unit transmitting information;
a sequencer having a first, second and third flip-flop;
an AND gate having inputs coupled to the bus for receiving the busy signal and the priority signal and coupled to an output of the first flip-flop for setting the second flip-flop in response to the busy signal and the priority signal both being at a selected logic state;
means for setting the third flip-flop in response to the output of the second flip-flop being at a selected logic state; and
means for resetting the first flip-flop.

2. A system as in claim 1 including means for coupling a unit having means for transmitting or receiving information to a memory;

means in said unit for generating a request signal to the memory for requesting communication therewith; and
means in said unit responsive to a wait signal from the memory for providing an access time interval determined by the wait signal.

3. A system as in claim 1 wherein the bus includes address and data signal paths, the address and data signal paths being connected to each unit in the system, the system additionally comprising means in each unit responsive to signals on the address signal path for selectively enabling an addressed unit to couple signals onto or from the data signal path.

4. A system as in claim 1 comprising means coupled to the busy signal and an output of the second flip-flop for changing the logic state of the busy signal in response to the first flip-flop being set.

5. A system as in claim 1 including means coupled to the third flip-flop for producing a request signal.

6. A system as in claim 1 including means coupled to the first and second flip-flops for providing an access time interval in response to an applied wait signal.

7. A system as in claim 1 including gating means coupled to an output of the first flip-flop and to receiving a priority signal from a higher priority unit generating and applying a priority signal to a lower priority unit.

8. A system for sharing a common bus without requiring centralized controlling logic among a plurality of master units each having means for transmitting information with at least one slave unit having means for receiving information comprising:

a bus for coupling the units;
means in each master unit for generating a busy signal onto the bus in response to transmitting information; and
means in each of said plurality of master units for inhibiting each master unit from transmitting information in response to detecting a busy signal generated by another master unit having a greater predetermined priority than said master unit.

9. A system as in claim 8 comprising:

a memory coupled to the bus;
means in one of said master units for generating a request signal to the memory for requesting communication therewith; and
means in the master unit responsive to a wait signal from the memory for providing an access time interval determined by the wait signal.

10. A system as in claim 8 comprising:

a memory coupled to the bus;
means in said one slave unit responsive to a wait signal from the memory for providing an access time interval determined by the wait signal.

11. A system as in claim 8 wherein the bus includes address and data signal paths, the address and data signal paths being connected to each master unit and slave unit in the system, the system additionally comprising means in each master unit and slave unit responsive to signals on the address signal path for selectively enabling an addressed unit to couple signals onto or from the data signal path.

* * * * *

UNITED STATES PATENT AND TRADEMARK OFFICE
CERTIFICATE OF CORRECTION

PATENT NO. : 3,999,170

DATED : December 21, 1976

INVENTOR(S) : Richard Ricker Lyman and Ole Eskedal

Figure 6:
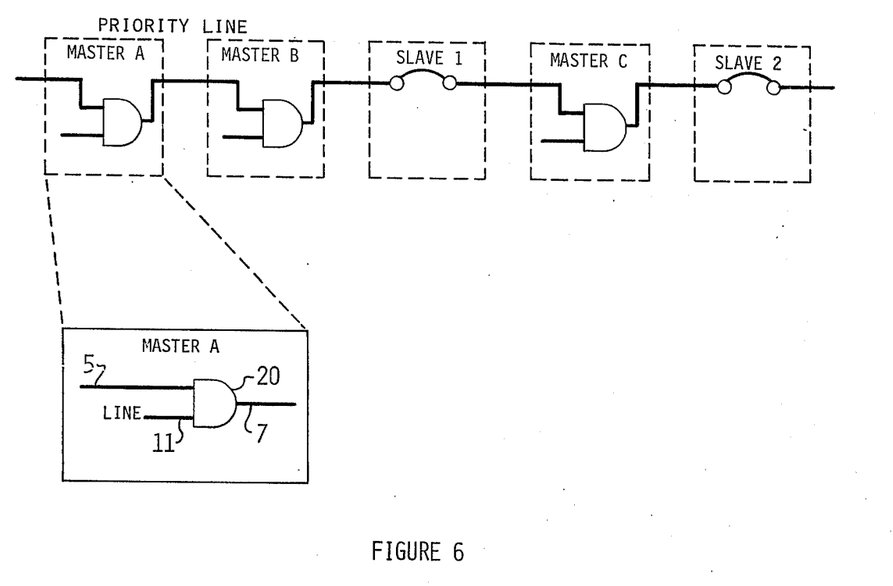
FIG. 6 is a schematic diagram illustrating a priority line.

It is certified that error appears in the above-identified patent and that said Letters Patent are hereby corrected as shown below:

Column 2, line 27, "Q" should read -- $\overline{Q}$ --; line 48, "Q" should read -- $\overline{Q}$ --; line 53, "Q" should read -- $\overline{Q}$ --;

Column 4, line 31, "FIG. 8" should read -- FIG. 6 --; line 41, "FIG. 11" should read -- FIG. 8 --; line 67, "C" should read -- D --.

Signed and Sealed this

Twenty-sixth Day of April 1977

[SEAL]

Attest:

RUTH C. MASON
*Attesting Officer*

C. MARSHALL DANN
*Commissioner of Patents and Trademarks*